(12) United States Patent
Steele et al.

(10) Patent No.: US 9,977,422 B2
(45) Date of Patent: May 22, 2018

(54) INTELLIGENT CONFIGURATION OF A USER INTERFACE OF A MACHINERY HEALTH MONITORING SYSTEM

(71) Applicant: Computational Systems, Inc., Knoxville, TN (US)

(72) Inventors: Kevin D. Steele, Knoxville, TN (US); Deane M. Horn, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 291 days.

(21) Appl. No.: 14/807,008

(22) Filed: Jul. 23, 2015

(65) Prior Publication Data

US 2016/0026172 A1    Jan. 28, 2016

Related U.S. Application Data

(60) Provisional application No. 62/029,606, filed on Jul. 28, 2014.

(51) Int. Cl.
| | | |
|---|---|---|
| *G06F 11/00* | (2006.01) | |
| *G05B 19/4065* | (2006.01) | |
| *G01M 7/00* | (2006.01) | |

(52) U.S. Cl.
CPC ........... *G05B 19/4065* (2013.01); *G01M 7/00* (2013.01); *G05B 2219/33273* (2013.01); *G05B 2219/37252* (2013.01); *G05B 2219/37434* (2013.01); *G05B 2219/37435* (2013.01)

(58) Field of Classification Search
None
See application file for complete search history.

(56) References Cited

U.S. PATENT DOCUMENTS

| | | | | | |
|---|---|---|---|---|---|
| 5,943,634 | A | * | 8/1999 | Piety | B23Q 17/12 700/280 |
| 6,839,660 | B2 | * | 1/2005 | Eryurek | G05B 23/0262 702/188 |
| 2003/0200060 | A1 | | 10/2003 | Eryurek et al. | |

FOREIGN PATENT DOCUMENTS

| | | |
|---|---|---|
| DE | 10347891 A1 | 5/2005 |
| DE | 102012001083 A1 | 7/2013 |

* cited by examiner

*Primary Examiner* — Cory Eskridge
(74) *Attorney, Agent, or Firm* — Luedeka Neely Group, P.C.

(57) ABSTRACT

A machinery health monitoring module processes machine vibration data based on vibration signals and provides the machine vibration data to a distributed control system. A distributed control system operator computer executes a software user interface that filters relevant configuration parameters based on a selected machine measurement type so that only those parameters that are applicable to the selected measurement type appear on the user interface screen. Further, configuration parameters for individual measurement values within the measurement type are made available only when a particular measurement value is selected for acquisition. This greatly simplifies the information that is displayed on the configuration user interface.

18 Claims, 10 Drawing Sheets

INTELLIGENT CONFIGURATION OF A USER INTERFACE OF A MACHINERY HEALTH MONITORING SYSTEM

RELATED APPLICATIONS

This application claims priority to provisional patent application Ser. No. 62/029,606, filed Jul. 28, 2014, titled "Methods and Apparatus for Integral Vibration Input and Output Card with Process Control System."

FIELD

This invention relates to the field of machine control and machine condition monitoring. More particularly, this invention relates to a system for automatically configuring a user interface screen in a distributed control system to simplify the presentation of machine condition monitoring configuration options based on specific types of measurements to be made on a machine.

BACKGROUND

In prior machinery health monitoring and machine protection systems, unique data acquisition hardware electronics were required for different measurement types, such as Relative Shaft Vibration, Case Vibration, Axial Thrust/Differential Expansion, Case Expansion, Eccentricity, and Tachometer measurements. More recently, hardware circuitry has been developed that can be configured to perform multiple measurement types using common acquisition hardware electronics. However, due to software limitations or programming shortcuts, the software user interface for configuring machinery health monitoring/protection systems and process control systems has continued to present configuration parameters that are not applicable to a specific measurement type. This unnecessarily complicates the process of configuring such systems for specific measurement types.

For example, as shown in FIG. 4, a known configuration user interface for a process control I/O card provides configuration tabs for both analog and digital channels, although the associated I/O module can be only an analog module or a digital module—not both.

In another example depicted in FIG. 5, machinery protection measurement "Keyphasor" configurations are displayed for an Acceleration measurement (and grayed out), although these configuration options do not apply to the selected measurement type. This results in an unnecessarily complicated and crowded configuration display screen.

In yet another current example depicted in FIG. 6, the nX machinery protection measurement configuration parameters are displayed (and grayed out), although the measurement value checkboxes have not been selected. Again, this results in an unnecessarily complicated configuration display screen.

Therefore, what is needed is an intelligent user interface that automatically presents to the user only those configuration options that are needed for specific measurements that are to be made using specific sensor types.

SUMMARY

Various embodiments of the invention provide a software user interface that filters relevant configuration parameters based on a selected machine measurement type so that only those parameters that are applicable to the selected measurement type appear on the user interface screen. Further, configuration parameters for individual measurement values within the measurement type are made available only when a particular measurement value is selected for acquisition. This greatly simplifies the information that is displayed on the configuration user interface.

Embodiments of the present invention provide a machinery health monitoring module that processes machine vibration data based on vibration signals and provides the machine vibration data to a distributed control system. The machinery health monitoring module preferably includes signal conditioning circuitry, processing circuitry and logic generator circuitry. The signal conditioning circuitry has an interface for receiving analog sensor signals from sensors attached to a machine, amplification and filter circuitry for conditioning the analog sensor signals, and analog-to-digital conversion circuitry for converting the analog sensor signals into digital sensor signals. The processing circuitry includes multiple parallel digital signal processing channels, each of which is operable to process a corresponding one of the digital sensor signals to generate multiple different types of measurement data per channel. The logic generator circuitry is operable to receive a first type of measurement data from the processing circuitry and to determine that a machine operating state has changed as indicated by the first type of measurement data. The logic generator circuitry is also operable to configure the processing circuitry to generate a second type of measurement data based on the change in machine operating state. The logic generator circuitry formats the first and second types of measurement data according to an input/output data protocol that is native to the distributed control system.

In some embodiments, the analog sensor signals include at least one analog tachometer signal, the analog-to-digital conversion circuitry converts analog tachometer signal to a digital tachometer signal, the processing circuitry processes the digital tachometer signal to generate machine speed data, and the logic generator circuitry determines that the machine operating state has changed as indicated by a change in the machine speed data.

In some embodiments, the logic generator circuitry determines that the machine operating state has changed from a steady-state speed condition to a coast-down state based on the machine speed data, and it configures the processing circuitry to generate the second type of measurement data comprising a transient vibration waveform measured while the machine is in the coast-down state.

In some embodiments, the logic generator circuitry determines that the machine operating state has changed based on the machine speed data indicating a drop in machine speed from above a predetermined speed threshold to below the predetermined speed threshold, and it configures the processing circuitry to generate the second type of measurement data while the machine operating state is below the predetermined speed threshold and to generate the first type of measurement data while the machine operating state is above the predetermined speed threshold.

In some embodiments, the first type of measurement data is collected over a first frequency range and the second type of measurement data is collected over a second frequency range that is different from the first frequency range.

In some embodiments, at least one of the parallel digital signal processing channels of the processing circuitry generates the measurement data in the form of a time waveform of the digital tachometer signal.

In some embodiments, the logic generator circuitry is in electrical communication with an input/output bus of the distributed control system through which the logic generator circuitry receives discrete input values indicative of the machine operating state that are generated by other machine measurement modules connected to the input/output bus. The logic generator circuitry determines that the machine operating state has changed based on a change in one or more of the discrete input values, and it adjusts alarm levels or generates the second type of measurement data based on the change in one or more of the discrete input values.

In some embodiments, the sensor signals include a machine vibration signal, and the processing circuitry includes a peak value detection channel that receives the machine vibration signal, samples the machine vibration signal during predetermined sample time periods, detects peak amplitude values of the machine vibration signal during the sample time periods, and produces a time series of the peak amplitude values. In these embodiments, the first or second type of measurement data comprises the time series of the peak amplitude values.

In another aspect, embodiments of the invention are directed to a distributed control system that includes an input/output bus, machinery health monitoring module, a distributed control system controller, and a distributed control system operator computer. Data are transferred through the input/output bus according to a data communication protocol that is native to the distributed control system. The machinery health monitoring module preferably includes signal conditioning circuitry, processing circuitry and logic generator circuitry. The signal conditioning circuitry has an interface that receives analog vibration signals from vibration sensors attached to a machine, amplification and filter circuitry for conditioning the analog vibration signals, and analog-to-digital conversion circuitry for converting the analog vibration signals into digital vibration signals. The processing circuitry includes multiple parallel digital processing channels, each of which processes a corresponding one of the digital vibration signals to generate multiple scalar vibration values per channel. The logic generator circuitry receives the scalar vibration values and formats the scalar vibration values according to an input/output communication protocol that is native to the distributed control system. The distributed control system controller includes interface circuitry having one or more fast-scan registers. The interface circuitry is operable to scan the input/output bus at a predetermined rate to receive one or more of the scalar vibration values into the fast-scan registers. The distributed control system operator computer executes user interface software to:
  generate a first graphical user interface screen for display on a user interface device, which includes a measurement type selection field and does not include sensor configuration option fields,
  receive a measurement type selection entered by a user in the measurement type selection field,
  based on the measurement type selection, generate a second graphical user interface screen for display on the user interface device, which includes one or more sensor configuration option fields that were not included in the first graphical user interface screen, where the sensor configuration option fields are specific to a sensor type to be used in making a measurement indicated by the measurement type selection,
  receive sensor configuration selections entered by the user in the sensor configuration option fields, and
  generate configuration data for configuring the machinery health monitoring module based on the measurement type selection and the sensor configuration selections.

In some embodiments, the distributed control system operator computer executes the user interface software to automatically assign one or more of the scalar vibration values to be read into the one or more fast scan registers, wherein the assignment is based at least in part on the measurement type selection.

In some embodiments, the distributed control system operator computer executes user interface software to:
  generate a graphical user interface screen that includes a machinery trip time delay input field that is initially preset to a default trip time delay value as prescribed by an industry standard, such as the API 670 Standard,
  generate the graphical user interface screen to include one or more input option fields for the machinery trip time delay, in which trip time delay values other than the default trip time delay value may be entered by a user,
  receive a trip time delay selection entered by a user in the machinery trip time delay input field, and
  generate configuration data for configuring the control logic routine based at least in part on the trip time delay selection.

In some embodiments, the distributed control system operator computer execute the user interface software to:
  generate configuration data for the control logic routine to initially implement a machinery protection bypass as prescribed by the industry standard for multiple sensor inputs corresponding to the multiple sensors,
  generate the graphical user interface screen to include one or more input option fields in which the user may choose to disable the machinery protection bypass for one or more of the sensor inputs,
  receive a machinery protection bypass selection entered by the user in the one or more input option fields, and
  generate configuration data for the control logic routine based at least in part on the machinery protection bypass selection.

In some embodiments, the distributed control system operator computer executes the user interface software to:
  generate configuration data for the control logic routine to initially implement a trip multiply as prescribed by the industry standard for all sensor inputs corresponding to the multiple sensors,
  generate the graphical user interface screen to include one or more input value fields for the trip multiply,
  generate the graphical user interface screen to include one or more input option fields in which the user may choose to disable the trip multiply for one or more of the sensor inputs,
  receive trip multiply selections entered by the user in the one or more input option fields, and generate configuration data for the control logic routine based at least in part on the trip multiply selections.

In some embodiments, the distributed control system operator computer executes the user interface software to:
  generate configuration data for the control logic routine to initially implement voting logic that allows or disallows a failed sensor to contribute to a vote to trip as prescribed by the industry standard,
  generate the graphical user interface screen to include one or more input option fields in which the user may choose to allow or disallow a failed sensor to contribute to a vote to trip,
  receive failed sensor voting option selections entered by the user in the one or more input option fields, and
  generate configuration data for the control logic routine based at least in part on the failed sensor voting option selection.

In some embodiments, the distributed control system operator computer executes the user interface software to:
generate configuration data for the control logic routine to initially implement alarm limits or alert limits as prescribed by the industry standard,
generate the graphical user interface screen to include one or more input value fields for the alarm limits or alert limits,
receive alarm limit or alert limit selections entered by the user in the one or more input value fields, and generate configuration data for the control logic routine based at least in part on the alarm limit or alert limit selections.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein:

FIGS. 4, 5 and 6 depict examples of prior art machinery protection software user interface screens;

DETAILED DESCRIPTION

Embodiments of the present invention provide a vibration data acquisition and analysis module that interfaces directly to a distributed control system I/O backplane to allow direct acquisition of vibration data by the DCS for purposes of machinery protection and predictive machinery health analysis. As the term is used herein, a "distributed control system (DCS)" is a type of automated control system used in a process or plant in which control elements are distributed throughout a machine or multiple machines to provide operational instructions to different parts of the machine(s). As the term is used herein, "protection" refers to using data collected from one or more sensors (vibration, temperature, pressure, etc.) to shut down a machine in situations in which severe and costly damage may occur if the machine is allowed to continue running "Prediction" on the other hand refers to using data collected from one or more vibration sensors, perhaps in combination with data from other types of sensors, to observe trends in machine performance and predict how much longer a machine can operate before it should be taken offline for maintenance or replacement.

Figure 1:
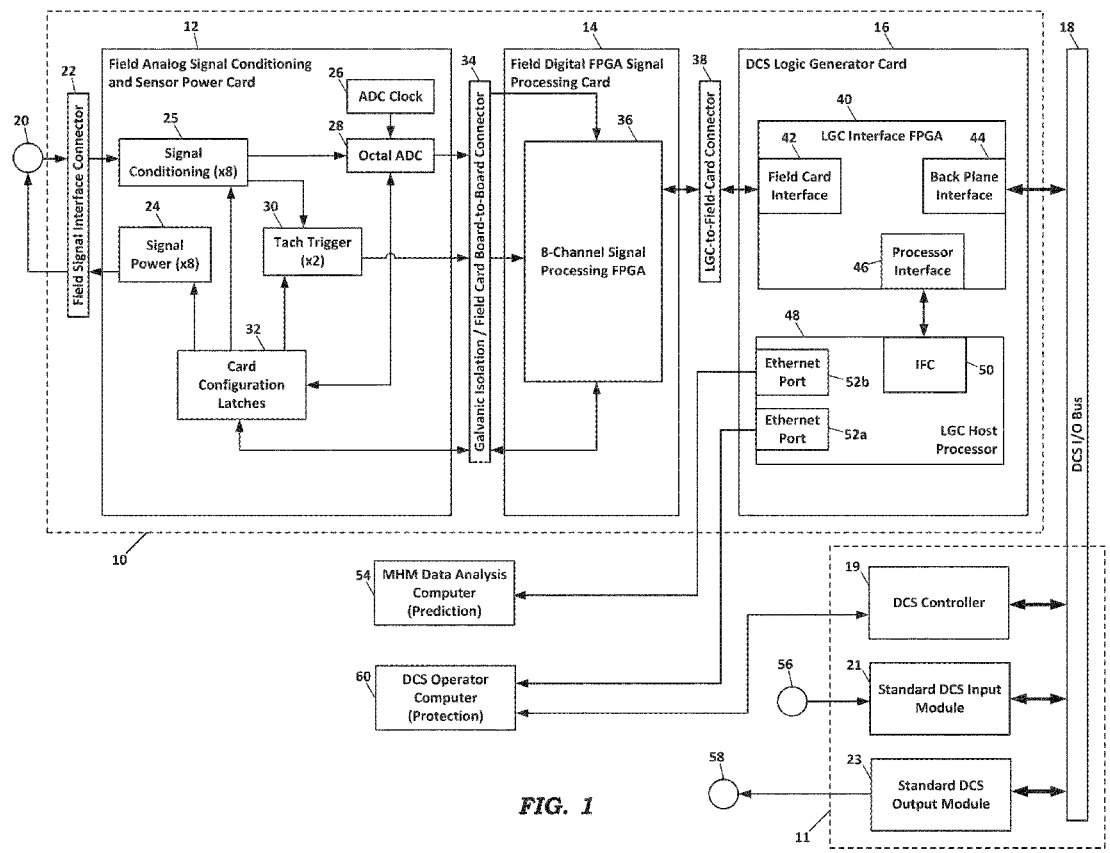
FIG. 1 depicts a machinery health monitoring (MHM) module according to an embodiment of the invention.

FIG. 1 depicts a machinery health monitoring module (MHM) 10 that directly interfaces with a DCS 11. In the preferred embodiment, the module 10 includes a field analog signal conditioning and sensor power card 12 that receives and conditions sensor signals, a field digital FPGA signal processing card 14 that processes the sensor signals, and a DCS logic generator card (LGC) 16 that provides an interface to a DCS I/O bus 18. The field card 12 can preferably accept input from at least eight measurement sensors 20 through a field signal interface connector 22. In a preferred embodiment, at least two of the sensor input channels may be configured as tachometer channels.

Preferably, galvanic electrical isolation is provided between the analog field card 12 and the digital field card 14. This electrical isolation prevents unintentional current flow, such as due to ground loops, between the mounting locations of the sensors 20 and the DCS 11.

Sensor power 24 and signal conditioning circuits 26 can support a wide range of sensors 20, including piezo accelerometers, piezo ICP velocity, piezo dynamic pressure, electro-dynamic velocity, eddy current displacement, AC vibration, and DC displacement, with 4-20 mA input current. Tachometer sensors that are supported include eddy current displacement sensors, passive electro-magnetic sensors, Hall Effect tachometer sensors, N pulse/rev shaft encoders, and TTL pulse sensors. Many additional sensor types are supported over the frequency range of DC to 20 KHz as long as they fall within the following exemplary voltage input ranges: 0 to +24V, −24V to +24V, −12V to +12V, and 0 to −24V. In the preferred embodiment, up to eight sensor power circuits 24 can be individually programmed for a constant current of between 0 and 20 mA, which may also be used as lift current for an electro-dynamic (passive) velocity sensor. The input voltage ranges listed above are also individually programmable on each sensor channel. This permits any mix of sensor power and input range configuration between the channels, thereby enabling a mix of supported sensors.

With timing provided by a clock 26, an 8-channel analog-to-digital converter (ADC) 28 converts the eight analog signals into a single serial data stream comprising eight simultaneously sampled interleaved channels of data. In some preferred embodiments, two tachometer triggering circuits 30 convert the two analog tachometer signals into tachometer pulses.

On the field card 14 is an 8-channel field programmable gate array (FPGA) 36 for processing the vibration data. The FPGA 36 receives the 8-channel digital waveform data, including possibly 2-channels of tachometer data, and processes the raw data in parallel to generate scalar overall vibration parameters and waveforms. The processed waveforms may include low-pass filtered, PeakVue™, order tracking, high-pass filtered (DC blocked), and selectable single-integrated (velocity), double-integrated (displacement), or non-integrated (acceleration) waveforms. These waveforms may also be generated on the two data channels dedicated to tachometer data. Prediction data channels also preferably include an up-sampling data block to provide higher resolution data for Time Synchronous Averaging (TSA) order tracking applications.

The vibration card configuration circuit 32 of the analog field card 12 preferably includes of a set of serial-to-parallel latch registers that accept a serial data stream of configuration data from the application firmware of the LGC 16. This data is loaded into a parallel-to-serial shift register in the interface of the FPGA 36. The FPGA 36 then handles shifting the serial data to the control latches using a synchronous SPI format.

During operation of the preferred embodiment, the MHM module 10 appears to the DCS controller 19 as a multichannel analog input card having scalar outputs similar to those of a standard DCS input module 21, such as may be outputting measured temperature, pressure, or valve position values. As discussed in more detail hereinafter, vibration signals are converted to scalar values by the module 10 and presented to the DCS controller 19 via the backplane of the DCS. One example of a DCS controller 19 is the Ovation™ controller manufactured by Emerson Process Management (a division of Emerson Electric Co.). In this DCS architecture, up to sixteen scalar values are presented from each I/O module as high speed scan values to the DCS controller 19. In a high speed scan, the DCS controller 19 can read these sixteen scalar values at up to a 10 mS rate.

Time waveform block data (and additional scalar values) may be transferred to the DCS controller 19 via the DCS I/O bus 18 using a block data transfer method, such as Remote Desktop Protocol (RDP), at a rate that is lower than the scan rate of the sixteen high speed scalar values.

As the scalar values generated by the machinery health monitoring module 10 are read by the DCS controller 19, they are processed by software running in the DCS controller 19 in the same manner as any other DCS data. One primary function of the DCS controller 19 is to compare the scalar values with alarm limits. If the limits are exceeded, alarms are generated. Logic within the DCS controller 19 may also determine whether any actions should be taken based on alarm conditions, such as closing a relay. Operations including alarm relay logic, voting, and time delays are also performed in software by the DCS controller 19. Preferably, DCS control outputs, such as relay outputs and 4-20 mA proportional outputs, are driven by standard output modules 23 of the DCS. Bulk prediction data is formatted in the LGC host processor 48 and is transmitted via an Ethernet port 52a to a machine health management (MHM) analysis computer 54 for detailed analysis and display. Bulk protection data is also formatted in the LGC host processor 48, but is transmitted via a separate Ethernet port 52b to the DCS operator computer 60.

In preferred embodiments, a DCS operator computer 60 includes an interface for displaying vibration parameters and other machine operational data (pressures, temperatures, speeds, alarm conditions, etc.) that are output from the DCS controller 19.

Figure 2:
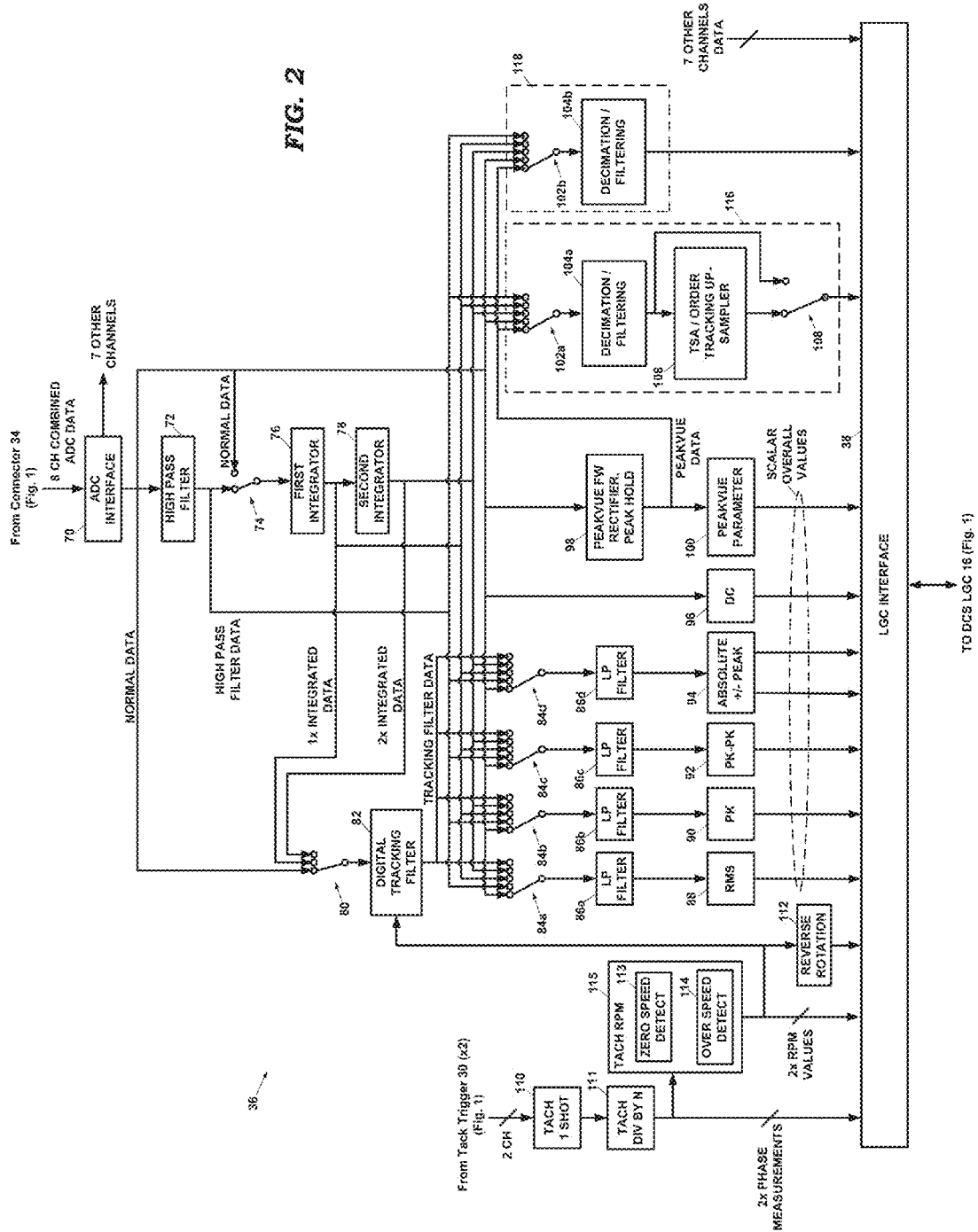
FIG. 2 depicts field digital FPGA signal processing circuitry according to an embodiment of the invention.

A functional block diagram of a single channel of the field digital FPGA 36 is depicted in FIG. 2. A preferred embodiment includes seven additional channels having the same layout as the one channel depicted in FIG. 2. As described in more detail hereinafter, the channel digital waveform data may be routed through a variety of digital filters and integration stages before being converted to vibration overall values or packaged as "bulk" time waveforms for further analysis by software running on the LGC card 16 or for transmission to DCS software or MHM software.

As shown in FIG. 2, an ADC interface 70 receives the eight channels of continuous, simultaneously sampled data from the ADC 28 of the field analog card 12 through the connector 34 (shown in FIG. 1). The data is preferably in the form of a multiplexed synchronous serial data stream in Serial Peripheral Interface (SPI) format. The ADC interface 70 de-multiplexes the data stream into eight separate channel data streams.

Although all eight channels could be used for vibration signal processing, in a preferred embodiment two of the eight channels can be used for tachometer measurement processing. Each tachometer measurement channel preferably includes:

a one-shot 110, which is a programmable trigger "blanking" function that provides noise rejection for tachometer pulse trains having excessive jitter or noise;

a divide-by-N 111, which is a programmable pulse divider that divides pulse rates of tachometer signals produced by gears or code wheels;

a reverse rotation detector 112 that determines the direction of shaft rotation by comparing the phase of two tachometer pulse signals;

an RPM indicator 115 that calculates the RPM of the tachometer pulse stream as a scalar overall value.

a zero-speed detector 113 that provides a "zero speed" indication when the tachometer has been inactive for a programmable interval, such as 0.1 s, 1 s, 10 s, or 100 s; and a detector 114 that provides an "over range" indication when the tachometer exceeds a fixed 2 KHz or 62 KHz threshold. In alternative embodiments, this threshold may be programmable.

With continued reference to FIG. 2, each of the eight independent parallel channels of signal processing in the FPGA 36 preferably includes the following components:

a high pass filter 72 for DC blocking, which can preferably be set to 0.01 Hz, 0.1 Hz, 1 Hz, or 10 Hz, and which may be selected or bypassed for the integrators described below based on the position of a switch 74;

two stages of digital waveform integration, including a first integrator 76 and a second integrator 78, which provide for data unit conversion from acceleration to velocity, acceleration to displacement, or velocity to displacement;

a digital tracking band pass filter 82 having a band pass center frequency that is set by the tachometer frequency or multiples of the tachometer frequency, and that receives as input either the "normal" data stream (no integration), the single integration data stream, or the double integration data stream based on the position of a switch 80, as described in more detail below; and scalar overall measurement calculation blocks 88-100 that determine several different waveform scalar overall values as described below.

In the preferred embodiment, the purpose of the digital tracking band pass filter 82 is to provide a narrow (high Q) band pass response with a center frequency determined by the RPM of a selected tachometer input. The center frequency may also be a selected integer multiple of the tachometer RPM. When a waveform passes through this filter, only vibration components corresponding to multiples of the turning speed of the monitored machine will remain. When the RMS, peak, or peak-to-peak scalar value of the resultant waveform is calculated by the corresponding FPGA calculation block (88, 90 or 92), the result is same as a value that would be returned by an "nX peak" calculation performed in the application firmware of the LGC 16. Because this scalar calculation is performed as a continuous process in the FPGA 36 rather than as a calculation done in firmware, it is better suited to be a "shutdown parameter" as compared to a corresponding value produced at a lower rate in firmware. One application of this measurement is in monitoring aero-derivative turbines, which generally require a tracking filter function for monitoring.

For several of the scalar overall values, the individual data type from which the values are calculated may be selected from the normal data stream, the single-integrated data stream, the double-integrated data stream, the high-pass filtered (DC blocked) data stream, or the tracking filter data stream based on the positions of the switches 84a-84d. Also, several of the scalar overall channels have an individually-programmable low-pass filter 88a-88d. In the preferred embodiment, these scalar overall values are generated independently of and in parallel to the time waveforms that are used for prediction or protection. The scalar overall measurement calculation blocks preferably include:

an RMS block 88 that determine the RMS value of the time waveform, where the RMS integration time may preferably be set to 0.01 s, 0.1 s, 1 s, or 10 s;

a peak block 90 that determines the greater of the positive or negative waveform peak value relative to the average value of the waveform, which is preferably measured over a period determined by either the tachometer period or a programmable time delay;

a peak-peak block 92 that determines the waveform peak-to-peak value over a period determined by either the tachometer period or a programmable time delay;

an absolute +/− peak block 94 that determines the value of the most positive signal waveform excursion and the value of the most negative signal waveform excursion relative to the zero point of the measurement range, which is preferably measured over a period determined by either the tachometer period or a programmable time delay;

a DC block 96 that determines the DC value of the time waveform, which has a measurement range preferably set to 0.01 Hz, 0.1 Hz, 1 Hz, or 10 Hz; and a PeakVue™ block 100 that determines a scalar value representing the peak value of the filtered and full-wave-rectified PeakVue™ waveform as described in U.S. Pat. No. 5,895,857 to Robinson et al. (incorporated herein by reference), which is preferably measured over a period determined by either the tachometer period or a programmable time delay. Full wave rectification and peak hold functions are implemented in the functional block 98. The PeakVue™ waveform from the block 98 is also made available as a selectable input to the prediction time waveform and protection time waveform processing described herein.

The prediction time waveform processing section 116 of the FPGA 36 provides a continuous, filtered time waveform for use by any prediction monitoring functions. An independent lowpass filter/decimator 104a is provided so that the prediction time waveform may be a different bandwidth than the protection time waveform. A waveform up-sampling block 106 provides data rate multiplication for analysis types such as Time Synchronous Averaging (TSA) and Order Tracking Input to the prediction time waveform processing section 116 may be selected from the normal data stream, the single-integrated data stream, the double-integrated data stream, the high-pass filtered (DC blocked) data stream, or the PeakVue™ data stream based on the positions of the switch 102a.

The protection time waveform section 118 of the FPGA 36 provides a continuous, filtered time waveform for use by protection monitoring functions. An independent low pass filter/decimator 104b is provided so that the protection time waveform may be a different bandwidth than the prediction time waveform. Input to the protection time waveform processing section 118 may be selected from the normal data stream, the single-integrated data stream, the double-integrated data stream, the high-pass filtered (DC blocked) data stream, or the PeakVue™ data stream based on the positions of the switch 102b.

Preferred embodiments provide for transient data collection, wherein continuous, parallel time waveforms from each signal processing channel may be collected for transmission to external data storage. Transient waveforms are preferably fixed in bandwidth and are collected from the protection time waveform data stream.

As shown in FIG. 1, the scalar overall values, as well as the digitally filtered time waveforms, pass through the LGC interface 38 to the LGC logic board 16 for further processing and transportation to the DCS controller 19 via the DCS I/O backplane 18 or to external software applications running on the MHM data analysis computer 54 via the Ethernet port 52.

Figure 3:
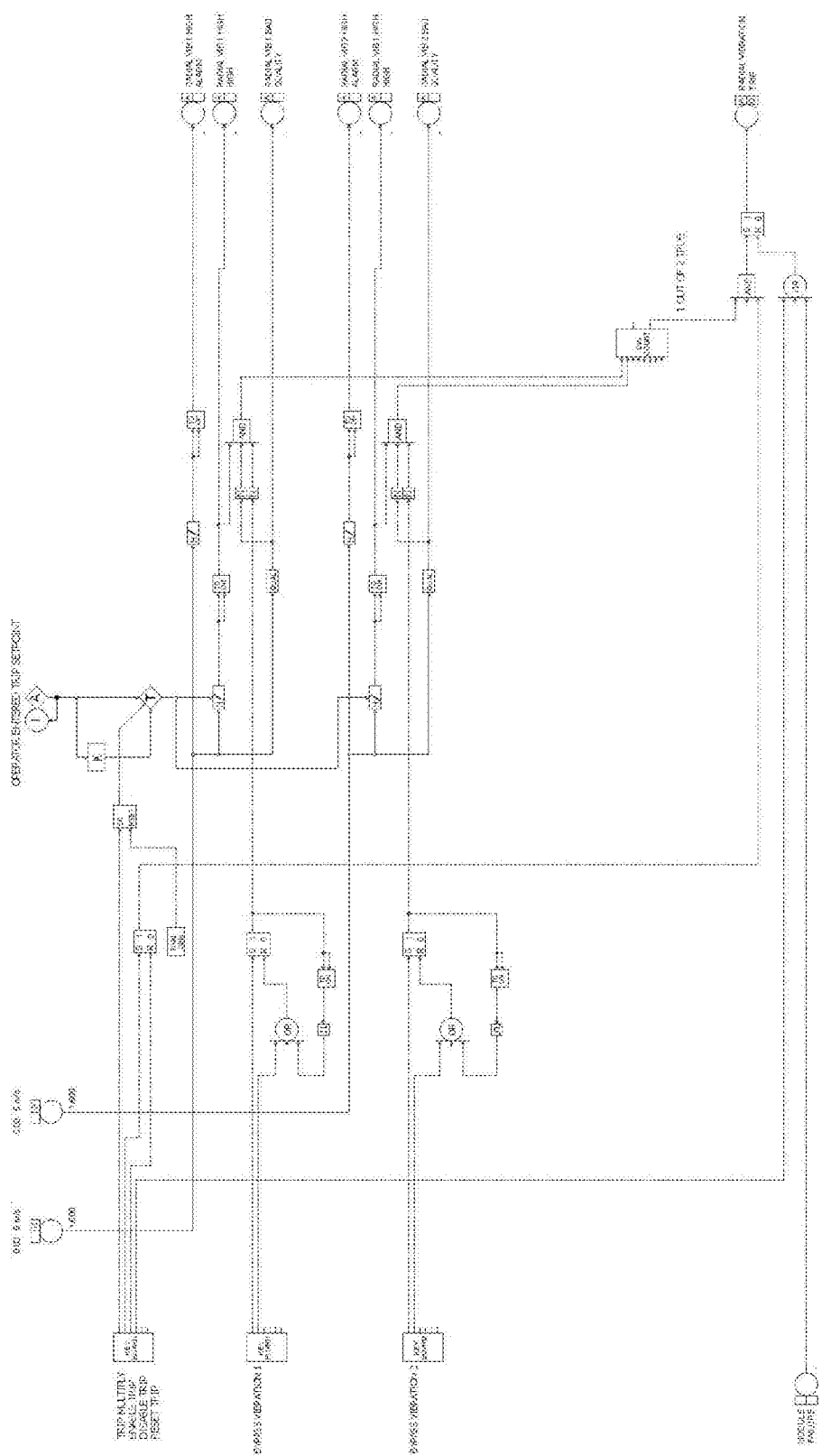
FIG. 3 depicts an example of control logic executed by a DCS controller according to an embodiment of the invention.
Figure 6:
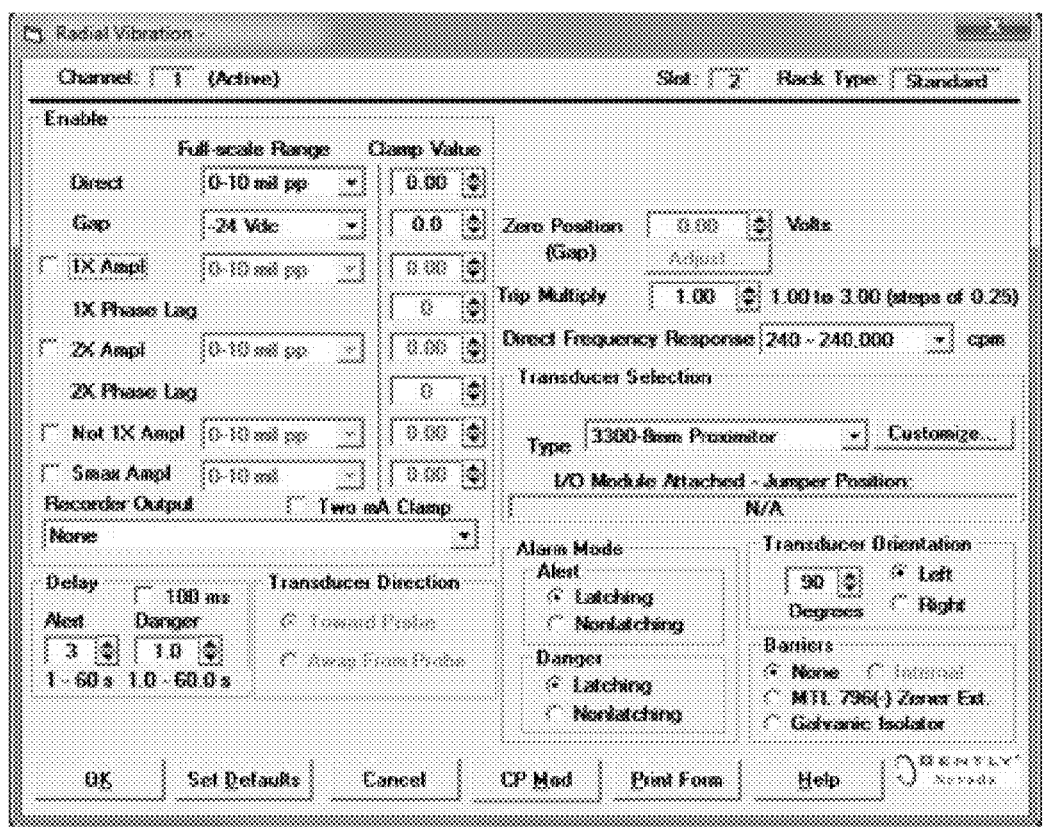

FIG. 3 depicts an example of a control logic routine (also referred to herein as a control sheet) that is performed by the DCS controller 19. In preferred embodiments, a control sheet is scheduled to execute at a predetermined rate, such as 1 sec, 0.1 sec, or 0.01 sec, by the DCS software running in the controller 19. As the control sheet that controls the vibration process is executed, scalar overall vibration values are scanned from the DCS I/O bus 18 and output values are generated at the execution rate of the control sheet.

Logic functions performed by the control sheets preferably include:

Voting logic, such as logic to determine that an alert condition exists if 2 out of 2 scalar values are over threshold, or 2 out of 3 are over threshold.

Combining vibration data with other DCS process parameter data (such as pressure and temperature).

Trip multiply, which is a temporary condition determined by current machine state or by manual input that increases an alarm level. Trip multiply is typically used during the startup of a rotational machine, such as a turbine. As the turbine speeds up, it normally passes through at least one mechanical resonance frequency. Since higher than normal vibration conditions are measured during this resonance, "trip multiply" is used to temporarily raise some or all of the alarm levels to avoid a false alarm trip. The trip multiply input may be set manually with operator input, or automatically based on RPM or some other "machine state" input.

Trip bypass, which is typically a manual input to suppress operation of the output logic to disable trip functions, such as during machine startup. Trip bypass is a function that suppresses either all generated vibration alarms, or any outputs that would be used as a trip control, or both. The trip bypass input may be set manually with operator input, or automatically based on some "machine state" input.

Time delay, which is a delay that is normally programmed to ensure that trip conditions have persisted for a specified time before allowing a machine trip to occur. Trip time delays are normally set to between 1 and 3 seconds as recommended by the API 670 Standard. The purpose of this delay is to reject false alarms caused by mechanical or electrical spikes or glitches.

Intelligent Configuration of User Interface

As discussed above, the DCS operator computer 60 provides an interface for displaying vibration parameters and other machine operational data output from the DCS controller 19. In a preferred embodiment, the DCS operator computer 60 executes user interface (UI) software that, among other things, creates a configuration file for configuring the measurement channels of the MHM module 10. This configuration file is preferably received by the LGC Host Processor 48, which uses it to configure many of the other components of the MHM module 10.

Figure 10:
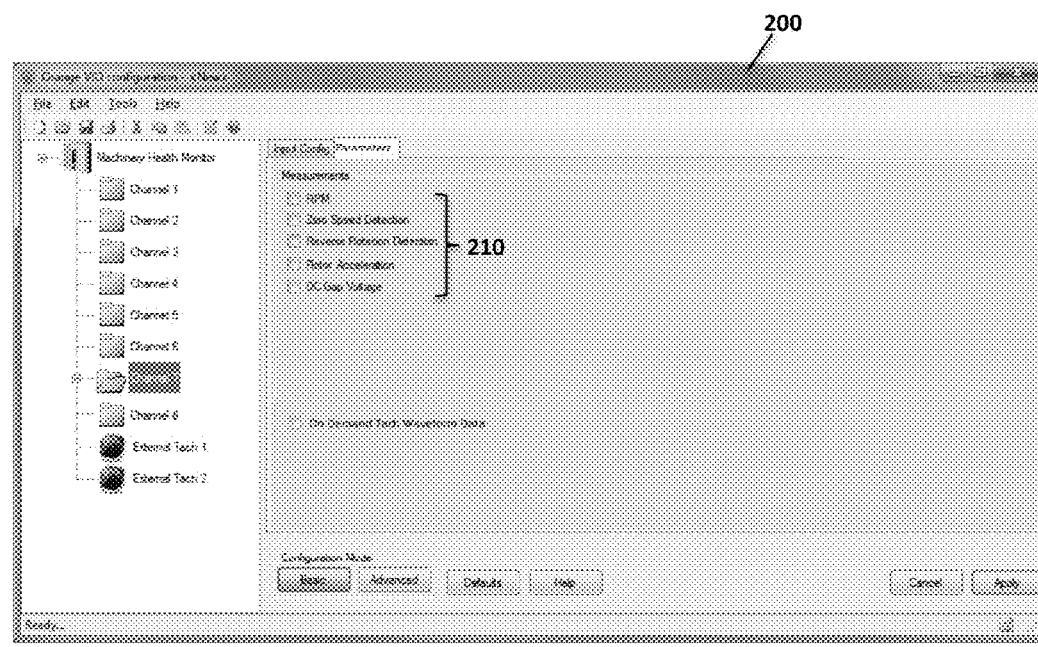
Figure 11:
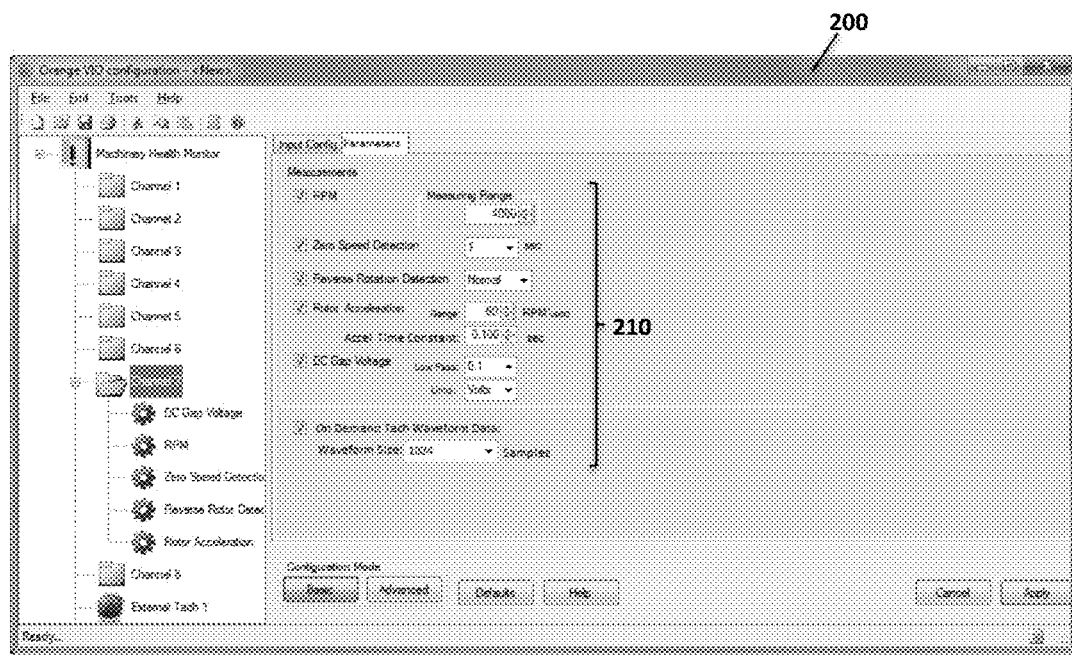
Figure 12:
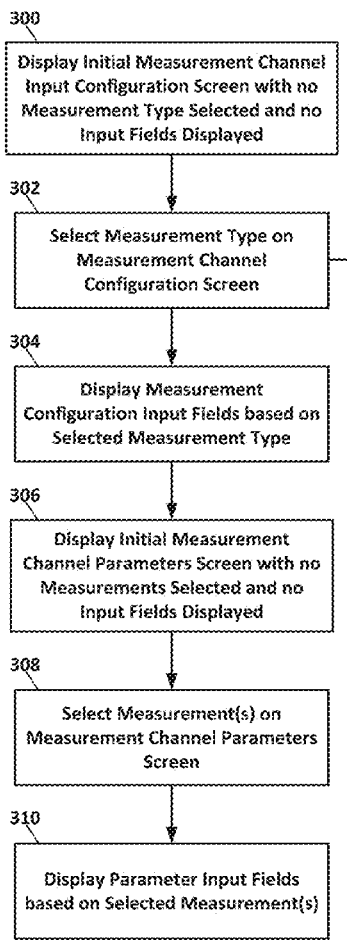
FIGS. 12-14 depict process flow diagrams for methods for configuring measurement channels according to embodiments of the invention.
Figure 13:
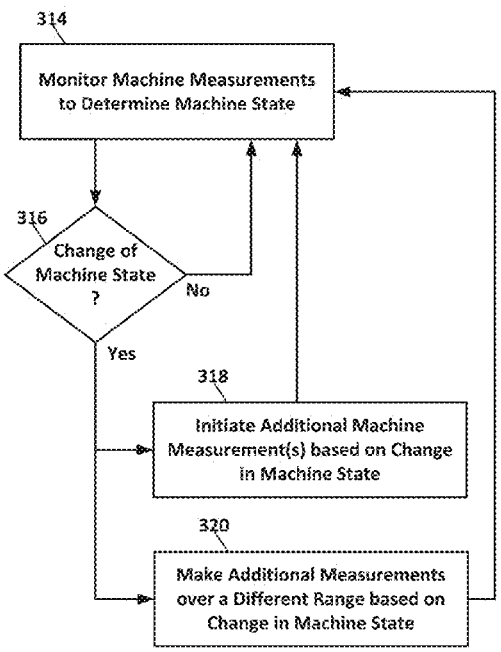
Figure 14:
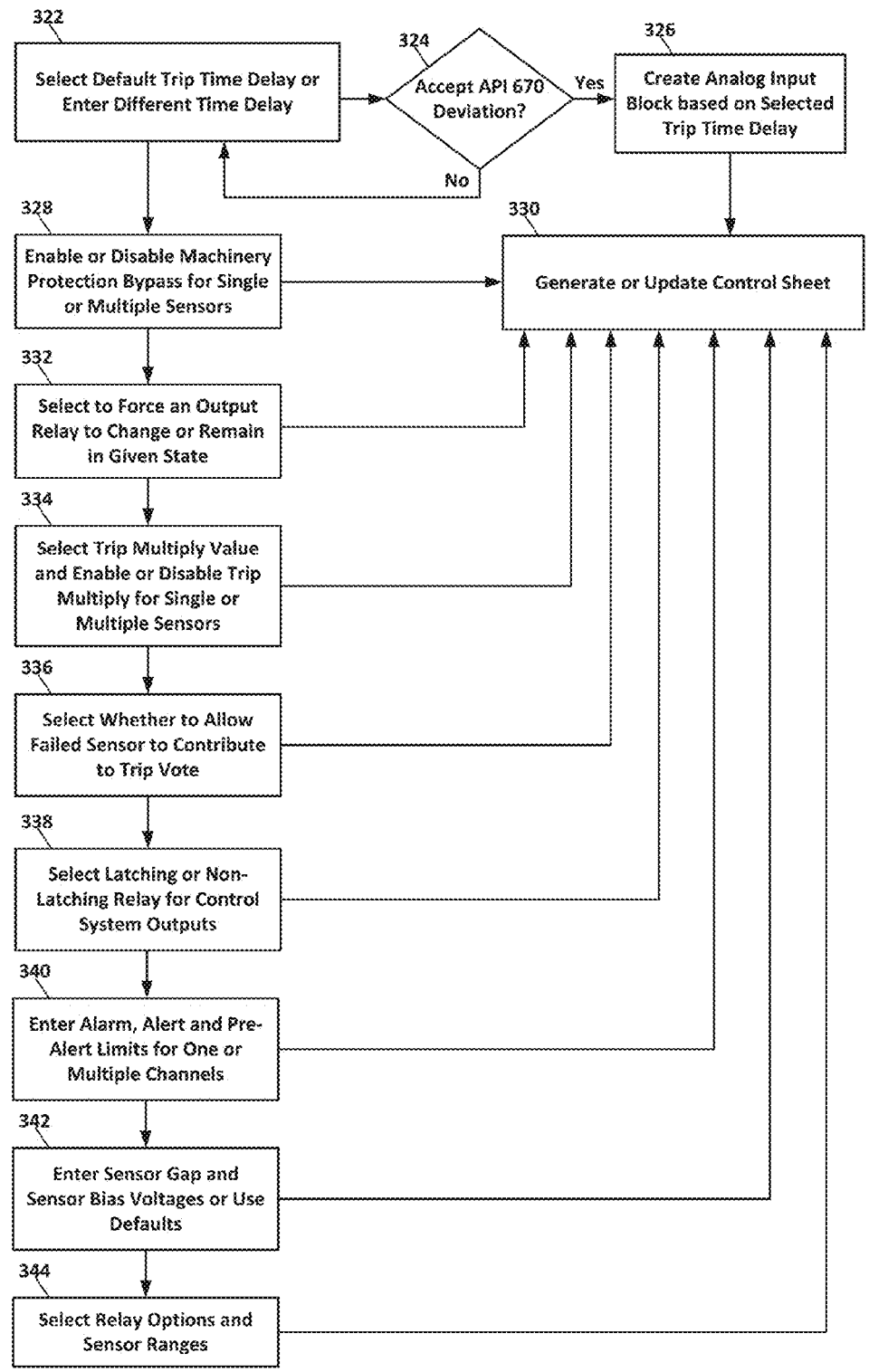

Examples of UI screens for configuring the measurement channels are depicted in FIGS. 7-11. FIGS. 12-14 depict process flow diagrams for embodiments of methods for configuring measurement channels.

Figure 7:
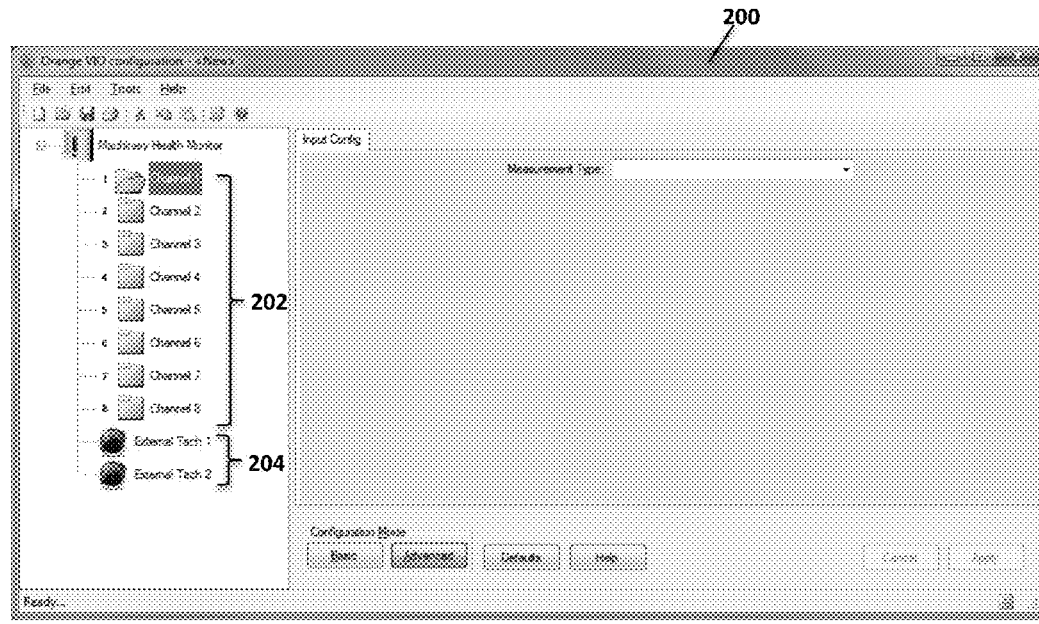
FIGS. 7-11 depict examples of measurement channel configuration interface screens according to embodiments of the invention.
Figure 8:
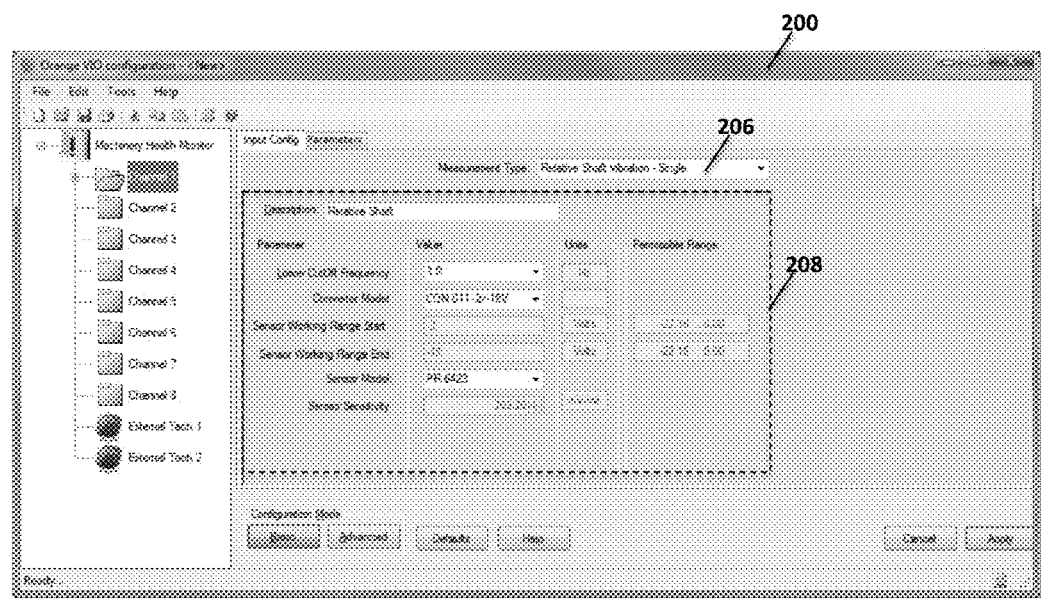

FIG. 7 depicts an initial channel configuration screen 200 that provides for configuring eight vibration measurement channels 202 and two external tachometer channels 204 (step 300 in FIG. 12). In this initial configuration screen 200, no measurement type has been selected for Channel 1 on the input configuration tab, and no measurement specific configuration input fields are displayed. FIG. 8 depicts the channel configuration screen 200 wherein a Relative Shaft Vibration measurement type has been selected in the input field 206 for Channel 1 in the input configuration tab (step 302). Upon selection of the Relative Shaft Vibration measurement type, the screen 200 automatically updates to display only configuration input fields 208 for the Channel 1 input configuration tab that are associated with that particular measurement type (step 304). For example, input fields for the following parameters are exposed to allow for selection of the appropriate configuration values: Lower CutOff Frequency, Converter Model, Sensor Working Range Start, Sensor Working Range End, Sensor Model and Sensor Sensitivity.

Figure 9:
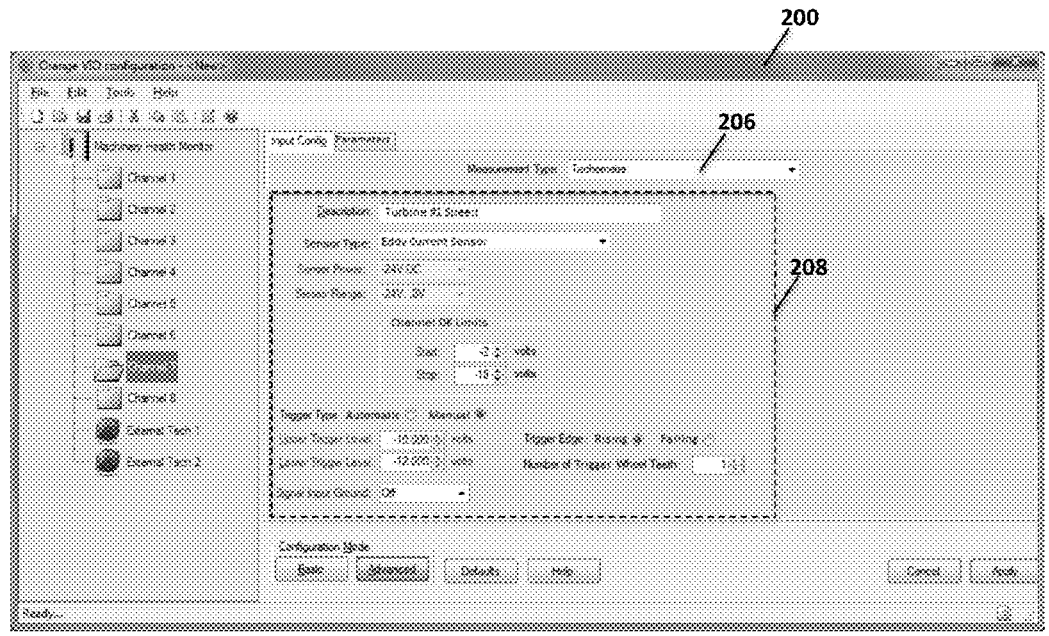

FIG. 9 depicts the channel configuration screen 200 wherein a Tachometer measurement type has been selected in the input field 206 for Channel 7 in the input configuration tab (step 302). Upon selection of the Tachometer measurement type, the screen 200 automatically updates to display only configuration parameter input fields 208 in the Channel 7 input configuration tab that are associated with tachometer measurements (step 304). FIG. 10 depicts an example wherein the parameters tab of the channel configuration screen 200 has been selected for a tachometer measurement type (step 306). At this point, no tachometer measurement values have been selected in the input fields 210, and no configuration parameters are displayed. FIG. 11 depicts an example wherein several tachometer measurements have been selected (RPM, Zero Speed Detection, Reverse Rotation Detection, Rotor Acceleration, DC Gap Voltage, and On Demand Tach Waveform Data) (step 308). Based on selection of these measurements, input fields 210 for several relevant configuration parameters are automatically exposed to allow for configuration of the selected measurements (step 310).

As discussed previously, the MHM module 10 converts vibration signals to scalar values and makes those scalar values available to the DCS controller 19 via the DCS I/O bus 18 (FIG. 1). In the typical DCS architecture, sixteen scalar values are made available as high-speed scan values that the DCS controller 19 reads at a predetermined rate, such as about every 10 mS. These values are read into "fast scan" registers in the DCS controller 19.

Based on the availability of sixteen high-speed scan values on the DCS I/O bus 18, two fast scan registers are assigned to each of the eight channels of the MHM module 10. As discussed above, the parallel measurement processing channels of the MHM module 10 are actually capable of producing more than two types of measurement values for each sensor input. In a preferred embodiment, software executed in the DCS logic generator card 16 automatically selects two of the multiple measurement values for each measurement channel to assign to the fast scan registers based on the type of measurement selected (step 312 in FIG. 12). For example, if the type of measurement selected is Relative Shaft Vibration, the two selected measurement values assigned to the fast scan registers may be Overall Peak to Peak and DC Gap Voltage.

In some preferred embodiments, firmware executed in the DCS logic generator card 16 monitors machine state (step 316 in FIG. 13), such as based on machine speed measurements (step 314), and initiates unique machinery health measurements or adjusts certain alarm levels corresponding to the unique machine state (step 318). For example, if the machine RPM output by the RPM indicator 115 shows that the machine state has changed from a steady-state speed condition to a trip/coast-down state, the software initiates the recording of a gapless transient waveform of vibration data during the coast-down period. This waveform data may come from the prediction time waveform processing section 116 of the FPGA 36. As another example, if the RPM indicator 115 shows that the machine state is less than 600 RPM, the software may perform an Eccentricity measurement to measure the amount of bent shaft. At above 600 RPM, the software turns off this measurement. In a third example, a vertical hydro-turbine may have four different operating states that are indicated by discrete input values made available via the DCS I/O bus 18. The software may set certain alarm levels or may make certain measurement types available for output based on the particular machine operating state.

In some preferred embodiments, firmware executed in the DCS logic generator card 16 monitors a first set of machinery health measurements collected over a first range to determine a unique machine state (step 314), and initiates a second set of unique machinery health measurements over a second range based on the machine state indicated by the first set of measurements (step 320). For example, the MHM module 10 might normally collect spectral vibration data only up to 2 kHz. However, if a first set of measurements indicates that the High Frequency Detection band is in an alarm condition, a second measurement with a spectrum of 20 kHz may be initiated to allow determination of the cause of the alarm in the high frequency range.

API 670 Control Sheet Logic

The API 670 Standard, as defined by the American Petroleum Institute (API), provides detailed requirements for monitoring and protecting equipment used on critical rotating machinery in oil refinery and petro-chemical plants. This standard covers the minimum requirements for a machinery protection system that may measure radial shaft vibration, casing vibration, shaft axial position, shaft rotational speed, piston rod drop, phase reference, over-speed, surge detection, and critical machinery temperatures (such as bearing metal and motor windings).

Combining machine vibration monitoring with machine control typically requires either (1) configuring a vibration machinery protection system and then integrating the machinery protection system with a process control system, or (2) inputting vibration information directly to the process control system and manually configuring the process control system for best practices in vibration machinery protection, such as according to the API 670 Standard. There are several problems with option (1), including that the integration process is time consuming, and requires training, additional hardware, software, configuration, and ongoing support. The problem with option (2) is that process control system operators are usually not skilled in the art of safely configuring a process control system for the application task of protecting machines against high vibration.

Preferred embodiments described herein provide a system that addresses the problems associated with option (2). The system includes UI software for a process control system that guides a user and takes user input based on vibration industry best practices and the API 670 Standard. The system uses built-in UI program logic to guide an unskilled user in building an API 670 control sheet for a process control system.

In preferred embodiments, the user interface (UI) program logic pre-selects one second as the default time delay before a machinery trip occurs as per the API 670 Standard, and automatically creates an Analog Input block with this default time delay (step 322 in FIG. 14). As the term is used herein, an Analog Input (AI) block is an object within the control logic that is used to read in analog input signals from analog input hardware. Typically, the AI block has internal alarm limits that may have configurable time delays before annunciating. By creating an AI block with desired settings automatically, preferred embodiments of the invention relieve the user from having to manually drag and drop the AI block from a palette onto a workspace and open/configure it for alarming with time delay.

The UI program logic also presents user-selectable options for other API 670 acceptable values of 2 second and 3 second delays, and automatically creates an AI block with the user-selected time delay (step 326). In some embodiments, the UI program logic presents the user an option to deviate from the API 670 Standard by typing in a user-selected value for time delay, and the software automatically creates an AI block with the user-selected time delay. The user has the ability to accept the custom value as an accepted deviation (step 324), which will be automatically saved to a list of deviations.

In some embodiments, the UI program logic automatically creates control sheet logic to implement a machinery protection bypass per the API 670 Standard for each sensor input. The UI program logic preferably provides the user the option to enable or disable this bypass for each sensor input (step 328). Also referred to herein as a Trip Bypass, a machinery protection bypass allows for bypassing the machinery shutdown alarm limits. Such a bypass would be needed, for example, if maintenance is being performed on the protection system, to avoid accidentally tripping the machine.

The UI program logic also provides a means for the user to create groupings for the sensors so that multiple sensors can be bypassed with a single user input. The UI program logic further provides a means for the user to select a "force" that will force an output relay state to change or to remain in a given state (step 332), and it automatically creates bypasses, groupings and forces in the control sheet (step 330).

In some embodiments, the UI program logic automatically creates a control sheet to implement a trip multiply per the API 670 Standard for each sensor input. The UI program logic preferably provides the user an option to select a default value, to enter an API 670 optional value, or to enter a user-preferred value that is outside of the API 670 specification (step 334). The UI program logic also may provide the user an option to enable or disable the trip multiply for each sensor input. The UI program logic may further provide a means for the user to create groupings for the sensors so that the trip multiply may be applied to multiple sensors with a single user input, and it automatically creates trip multiplies and groupings in a control sheet (step 330).

In some embodiments, the UI program logic presents to the user an option for radial sensors to implement the API 670 Standard default that does not allow a failed sensor to contribute to a vote to trip. The user is preferably presented an alternative option to allow a bad sensor, converter or cable to contribute to a vote to trip (step 336). In these embodiments, the control sheet automatically votes in/out the sensor, converter and cable condition for trip decisions based on the user's input (step 330).

In some embodiments, the UI program logic presents to the user an option to implement the API 670 Standard default condition that allows a failed thrust sensor to contribute to a vote to trip. The user is preferably presented an alternative option to not allow a failed sensor, converter or cable to contribute to a vote to trip (step 336). In these embodiments, the control sheet automatically votes in/out the sensor, converter and cable condition for trip decisions based on the user's input (step 330).

In some embodiments, the UI program logic presents to the user an option to select latching or non-latching relays for each control system output (step 338). The UI program logic automatically creates a control sheet to latch or automatically reset the relay when the alarm condition is true and then becomes false (step 330).

In some embodiments, the UI program logic provides a method for the user to enter alarm limits, alert limits and pre-alert limits for each measurement channel or group of channels (step 340), and the UI program logic automatically applies these limits to the control sheet for determining alarms and relay activation (step 330).

In some embodiments, the UI program logic creates a control sheet that automatically: (1) puts a date and time stamp on all incoming vibration and status data; (2) configures a digital input (DI) for resetting latching relays; (3) configures a digital output (DO) and a UI visible element for annunciating bypasses; and (4) configures a DO in the control sheet to output the status of all hardware.

In some embodiments, sensor gap voltages and sensor bias voltages are initially set up with default voltage values, and the UI program logic allows the user to edit these values (step 342) and they are automatically updated in the control sheet (step 330).

In some embodiments, the UI program logic generates the control sheet according to the API 670 Standard to automatically capture and update the highest radial shaft vibration measurement at each bearing, all axial measurements, the highest machine casing vibration measurement, the highest speed measurement, the highest rod drop measurement, and the highest temperature measurement at each bearing.

In some embodiments, the UI program logic provides an option for the user to select relay options (step 344) that the UI program logic uses to automatically configure the control sheet logic based on the user selection (step 330). These relay options preferably include normally de-energized, normally energized, de-energized to alarm, and energized to shutdown.

In some embodiments, the UI program logic provides options for the user to select the default ranges for axial thrust measurements (such as −40 to +40 mils) and radial vibration measurements (0 to 125 microns), or to input custom values for these ranges. User selections can be edited and saved for future default configurations. For each selected range, the UI program logic generates the control sheet based on the default or custom values. Custom values are preferably captured in an API 670 Standard deviation report. In preferred embodiment, the UI program logic automatically configures a circuit fault in the control sheet for vibration greater than 10 mils.

In some embodiments, when 2-out-of-3 logic is selected for axial thrust measurements, the UI program logic automatically configures the control sheet by default to include a vote to trip on high vibration or sensor failure.

In some embodiments, when a temperature sensor is used as input, the UI program logic automatically configures the control sheet by default to a full scale temperature range, such as 0 C to 150 C, and digital readouts are automatically configured in the control logic with 1 degree of resolution. Preferably, the UI program logic configures dual voting for temperature as the default configuration as per the API 670 Standard. Other voting configurations that are accepted by the user will be flagged in the API 670 exceptions list.

In some embodiments, the UI program logic uses the configuration settings for each configured channel to automatically generate graphical elements that are displayed to the user on the DCS operator computer 60 during runtime. These graphical elements preferably: (1) include bar graphs that are proportional to vibration, position, temperature, or any main value; (2) provide graphical indication of alarm, alert and pre-alert levels; (3) include engineering units; (4) provide a graphical indication of a highest value measured; (5) provide a name or description for each displayed value; (6) automatically configure to full scale range; (7) provide an indication of sensor, cable, and converter health; (8) provide a positive indication of fault or no fault; (9) provide an indication of the status of relays; (10) provide an indication of circuit faults; (11) provide an indication of vote results; (12) provide a method for launching a trend of historic values and live values; (13) provide a password protected method for the user to edit alarm limits; and (14) provide a method for the user to reset latching relays.

In some embodiments, the user interface display screen includes a button that the user can click that will reset the highest measured speed peak. Preferably, the control logic is automatically configured for this software user input or DI that resets the speed peak.

In some embodiments, pre-configured HART devices automatically pass along their configuration data to the control logic, which automatically configures the control sheet accordingly.

Generally, machinery protection is a balancing act between safety and machine availability. Some applications may lean more toward safety, such as tripping within 100 msec, or counting a failed sensor as a vote to trip. Other applications may lean more toward availability, such as implementing a three second delay before trip, or not counting a failed sensor as a vote to trip. Accordingly, some embodiments of the UI program logic allow the user to "tune" multiple aspects of the control sheet configuration more toward safety or more toward availability. For example, a single graphical slider may be displayed on the DCS operator computer to provide an input to allow the user to select a point along a sliding scale having maximum safety at one end and maximum availability at the other end. In this embodiment, the UI program logic automatically adjusts trip timing and voting logic based on the slider setting.

Some embodiments implement a method for automatically accessing configuration information for the MHM module 10 and accessing configuration information for the distributed control system 11, and creating a control system configuration file used in configuring the distributed control system to receive data from the MHM module 10 in the native data format of the distributed control system. Some features of such a method are described in U.S. Pat. Nos. 8,463,417 and 8,958,900, the entire contents of which are incorporated herein by reference.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A machinery health monitoring module that processes machine vibration data based on vibration signals and provides the machine vibration data to a distributed control system, the machinery health monitoring module comprising:

signal conditioning circuitry having an interface for receiving a plurality of analog sensor signals from a plurality of sensors attached to a machine, amplification and filter circuitry for conditioning the plurality of analog sensor signals, and analog-to-digital conversion circuitry for converting the plurality of analog sensor signals into a plurality of digital sensor signals;

processing circuitry in electrical communication with the signal conditioning circuitry, the processing circuitry comprising a plurality of parallel digital signal processing channels, each channel operable to process a corresponding one of the plurality of digital sensor signals in parallel with the processing of other of the plurality of digital sensor signals in other of the channels, each channel configured to generate multiple different types of measurement data per channel including scalar vibration values and vibration waveforms; and logic generator circuitry in electrical communication with the processing circuitry and the signal conditioning circuitry, the logic generator circuitry operable to receive a first type of measurement data from the processing circuitry, and operable to determine that a machine operating state has changed as indicated by the first type of measurement data, and operable to configure the processing circuitry to generate a second type of measurement data based on the change in machine operating state, and operable to format the first type of measurement data and the second type of measurement data according to an input/output data protocol that is native to the distributed control system.

2. The machinery health monitoring module of claim 1 wherein the analog sensor signals include at least one analog tachometer signal, and wherein:

the analog-to-digital conversion circuitry is operable to convert the at least one analog tachometer signal to a digital tachometer signal;

the processing circuitry is operable to process the at least one digital tachometer signal to generate machine speed data; and the logic generator circuitry is operable to determine that the machine operating state has changed as indicated by a change in the machine speed data.

3. The machinery health monitoring module of claim 2 wherein the logic generator circuitry is operable to determine that the machine operating state has changed from a steady-state speed condition to a coast-down state based on the machine speed data, and is operable to configure the processing circuitry to generate the second type of measurement data comprising a transient vibration waveform measured while the machine is in the coast-down state.

4. The machinery health monitoring module of claim 2 wherein the logic generator circuitry is operable to determine that the machine operating state has changed based on the machine speed data indicating a drop in machine speed from above a predetermined speed threshold to below the predetermined speed threshold, and is operable to configure the processing circuitry to generate the second type of measurement data while the machine operating state is below the predetermined speed threshold and to generate the first type of measurement data while the machine operating state is above the predetermined speed threshold.

5. The machinery health monitoring module of claim 2 wherein the first type of measurement data is collected over a first frequency range and the second type of measurement data is collected over a second frequency range that is different from the first frequency range.

6. The machinery health monitoring module of claim 2 wherein at least one of the parallel digital signal processing channels of the processing circuitry is operable to generate the measurement data in the form of a time waveform of the digital tachometer signal.

7. The machinery health monitoring module of claim 1 wherein the logic generator circuitry is in electrical communication with an input/output bus of the distributed control system through which the logic generator circuitry receives discrete input values indicative of the machine operating state that are generated by other machine measurement modules connected to the input/output bus, and wherein the logic generator circuitry is operable to determine that the machine operating state has changed based on a change in one or more of the discrete input values, and wherein the logic generator circuitry is operable to adjust alarm levels or generate the second type of measurement data based on the change in one or more of the discrete input values.

8. The machinery health monitoring module of claim 1 wherein the sensor signals include a machine vibration signal, and wherein the processing circuitry includes a peak value detection channel operable to receive the machine vibration signal, sample the machine vibration signal during predetermined sample time periods, detect peak amplitude values of the machine vibration signal during the sample time periods, and produce a time series of the peak amplitude values, and wherein the first or second type of measurement data comprises the time series of the peak amplitude values.

9. A distributed control system comprising:
an input/output bus through which data are transferred according to a data communication protocol that is native to the distributed control system;
a machinery health monitoring module in electrical communication with the input/output bus, the machinery health monitoring module comprising:
signal conditioning circuitry having an interface for receiving a plurality of analog vibration signals from a plurality of vibration sensors attached to a machine, amplification and filter circuitry for conditioning the plurality of analog vibration signals, and analog-to-digital conversion circuitry for converting the plurality of analog vibration signals into a plurality of digital vibration signals;
processing circuitry in electrical communication with the signal conditioning circuitry, the processing circuitry comprising a plurality of parallel digital processing channels, each channel for processing a corresponding one of the plurality of digital vibration signals to generate a plurality of scalar vibration values per processing channel; and
logic generator circuitry in electrical communication with the processing circuitry, the logic generator circuitry executing instructions to automatically select one or more of the scalar vibration values from each of the processing channels based on a measurement type selection, and format the one or more selected scalar vibration values from each processing channel according to the data communication protocol that is compatible with the input/output bus; and
a distributed control system controller in electrical communication with the input/output bus, the distributed control system controller including interface circuitry having a plurality of fast-scan registers, the interface circuitry operable to scan the input/output bus at a predetermined rate to receive the one or more selected scalar vibration values into one or more of the plurality of fast-scan registers.

10. The distributed control system of claim 9 further comprising a distributed control system operator computer that generates the measurement type selection based on input from an operator.

11. A distributed control system comprising:
an input/output bus through which data are transferred according to a data communication protocol that is native to the distributed control system;
a machinery health monitoring module in electrical communication with the input/output bus, the machinery health monitoring module comprising:
signal conditioning circuitry having an interface for receiving a plurality of analog vibration signals from a plurality of vibration sensors attached to a machine, amplification and filter circuitry for conditioning the plurality of analog vibration signals, and analog-to-digital conversion circuitry for converting the plurality of analog vibration signals into a plurality of digital vibration signals;
processing circuitry in electrical communication with the signal conditioning circuitry, the processing circuitry comprising a plurality of parallel digital processing channels, each channel for processing a corresponding one of the plurality of digital vibration signals to generate multiple scalar vibration values per processing channel; and
logic generator circuitry in electrical communication with the processing circuitry, the logic generator circuitry operable to receive the multiple scalar vibration values and format the multiple scalar vibration values according to an input/output communication protocol that is native to the distributed control system; and
a distributed control system controller comprising:
interface circuitry that scans the input/output bus at a predetermined rate to receive one or more of the scalar vibration values therefrom; and
logic circuitry for executing a control logic routine that generates control signals based on logical processing of one or more of the scalar vibration values, the control logic routine initially configured to implement a default trip time delay as prescribed by an industry standard, wherein the control logic routine is automatically reconfigured to implement a selected trip time delay other than the default trip time delay based on a trip time delay selection; and
a distributed control system operator computer in electrical communication with the distributed control system controller, the distributed control system operator computer generating configuration data for automatically reconfiguring the control logic routine to implement the selected trip time delay based at least in part on the trip time delay selection.

12. The distributed control system of claim 10 wherein the distributed control system operator computer is operable to generate configuration data for configuring the machinery health monitoring module based on the measurement type selection.

13. The distributed control system of claim 9 wherein:
the logic generator circuitry executes instructions to automatically select two of the scalar vibration values from at least one of the processing channels based on the measurement type selection, and format the two selected scalar vibration values according to the data communication protocol that is compatible with the input/output bus; and
the interface circuitry of the distributed control system controller scans the input/output bus at a predetermined rate to receive the two selected scalar vibration values into two of the fast-scan registers.

14. The distributed control system of claim 11 wherein the control logic routine is initially configured to implement a machinery protection bypass as prescribed by the industry standard for a plurality of sensor inputs corresponding to the plurality of sensors, and is automatically reconfigured to disable the machinery protection bypass for one or more of the sensor inputs based on a machinery protection bypass selection.

15. The distributed control system of claim 11 wherein the control logic routine is initially configured to implement a trip multiply as prescribed by the industry standard for all sensor inputs corresponding to the plurality of sensors, and is automatically reconfigured to disable the trip multiply for one or more of the sensor inputs based on a trip multiply selection.

16. The distributed control system of claim 11 wherein the control logic routine is initially configured to implement voting logic that allows a failed sensor to contribute to a vote to trip as prescribed by the industry standard, and is automatically reconfigured to disallow a failed sensor to contribute to a vote to trip based on a failed sensor voting option selection.

17. The distributed control system of claim 11 wherein the control logic routine is initially configured to implement alarm limits or alert limits as prescribed by the industry standard, and is automatically reconfigured based on alarm limit selections or alert limit selections.

18. The distributed control system of claim 11 wherein the distributed control system operator computer executes instructions for generating the configuration data in the form of an analog input block comprising an object within the control logic routine that is used in reading the analog vibration signals from the signal conditioning circuitry.

* * * * *